United States Patent Office 3,803,251
Patented Apr. 9, 1974

3,803,251
PROCESS FOR FORMING DIFLUOROCARBENE AND 1,1-DIFLUOROCYCLOPROPANES
Dietmar Seyferth, Lexington, and Steven P. Hopper, Cambridge, Mass., assignors to Massachusetts Institute of Technology, Cambridge, Mass.
No Drawing. Filed Nov. 3, 1970, Ser. No. 86,590
Int. Cl. C07c 17/26, 23/04
U.S. Cl. 260—648 F               6 Claims

ABSTRACT OF THE DISCLOSURE

Difluorocarbene is formed in situ by reacting sodium iodide and an organo(trifluoromethyl)mercuric compound in the presence of a solvent that need not dissolve sodium iodide. Germ-difluorocyclopropanes are formed by effecting this reaction in the presence of an olefin.

---

The invention described herein was made in the course of work performed under a grant with the Department of the Air Force.

The present invention relates to a method for forming difluorocarbene in situ and to its reaction with a dihalocarbene acceptor to form 1,1-difluorocyclopropanes.

At the present time, dihalocarbenes are formed from a variety of organometallic compounds, particularly organo(trihalomethyl)mercury compounds. Dihalocarbenes are derived from organo(trihalomethyl)mercury compounds either by pyrolysis or by reacting the organo(trihalomethyl)mercury compound with sodium iodide. In some cases pyrolysis is undesirable since the rate of dihalocarbene formation is relatively slow. The sodium iodide-based process has the disadvantage that it requires the use of expensive solvents to dissolve the sodium iodide such as glyme or diglyme, both of which require extensive purification before use.

The present invention is based upon the discovery that organo(trifluoromethyl)mercury compounds can be reacted with sodium iodide to form difluorocarbene in the presence of a wide variety of solvents. Unexpectedly, it has been found that the solvent employed need not dissolve sodium iodide to attain difluorocarbene formation. The sodium iodide can exist in the reaction system as a solid suspension dispersed throughout the system or can be dissolved. This permits the use of readily available hydrocarbon solvents and therefore significantly reduces the cost of effecting difluorocarbene formation.

It is believed that the sodium iodide need not be dissolved in the case of organo(trifluoromethyl)mercury compounds because of the enhanced Lewis acidity of the mercury atom resulting from the powerful electron-attracting effect of the $CF_3$ substituent.

The reaction is represented by the following equation:

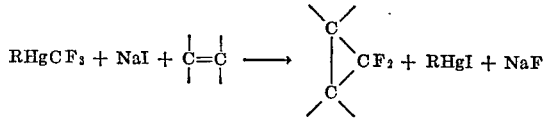

wherein R is alkyl or substituted or unsubstituted aryl including phenyl, naphthyl, diphenyl and condensed aromatic such as phenanthryl, anthryl or the like which can be substituted as for example with halogen or alkyl. The formula

represents any unsaturated dihalocarbene acceptor whether acyclic or cyclic. The particular organo(trifluoromethyl)mercury compound employed is not critical since the organo group does not enter into the difluorocarbene forming reaction.

The unsaturated difluorocarbene acceptors comprise organic compounds containing an olefinic double bond, the aromatic double bond in a condensed ring nucleus, an acetylenic triple bond, the carbon to nitrogen double bond, the carbon to nitrogen triple bond and polymers having a double bond as part of the repeating unit. Suitable unsaturated organic compounds include olefinic hydrocarbons, acetylenic hydrocarbons, fused ring aromatic hydrocarbons, nitriles, or the like.

The difluorocarbene acceptor and the organo(trifluoromethyl)mercuric compounds are employed in at least equimolar amounts. Usually the difluorocarbene acceptor is employed in excess to insure complete reaction of the difluorocarbene. Satisfactory results are obtained when employing a mole ratio of difluorocarbene acceptors to the organo(trifluoromethyl)mercuric compound within the range of from about 1:1 to about 20:1, preferably about 5:1 to about 10:1. In some instances, the unsaturated difluorocarbene acceptor may function as the dispersant for the reaction thereby eliminating the need for an additional solvent. Suitable compounds for this dual purpose include liquid difluorocarbene acceptors such as cyclohexene and heptene-1.

This process may be conducted at atmospheric pressure in an open vessel or autogenous pressure in a closed vessel. When the unsaturated organic compound is a gas under the reaction conditions pressure generally will be required. The exact temperature for this process depends, of course, on the particular reagents used, and the temperature must be sufficient to effect the reaction between the mercurial and the dihalocarbene acceptor and insufficient to decompose the 1,1-difluorocyclopropane formed. Generally good results will be obtained when the temperature is within the range of from about 30° C. to about 200° C. preferably from about 30° C. to about 110° C. Generally, reaction is complete within about 4 to 100 hours, depending on the reaction temperature.

If desired, the reaction may be conducted under an inert atmosphere such as nitrogen, the rare gases, or the like, although the process proceeds very well in the presence of air.

It is also preferred though not required that the reaction mixture be stirred during the course of the reaction due to the fact that the sodium iodide is substantially insoluble in hydrocarbon solvents. Stirring or any other suitable means for keeping the reagents in suspension aids in obtaining a smooth, efficient reaction. Other means of agitation may be employed, for instance bubbling an inert gas through the reaction mass or bubbling the acceptor through the reaction mass (provided the acceptor is a gas under the reaction conditions).

The organo(trifluoromethyl)mercury reactant can be prepared by direct fluorination by reacting three moles of an organomercuric fluoride with an organo-trihalomethyl)mercury compound wherein the halogen atom is chlorine and/or bromine. The bromine atoms are replaced with fluorine at a reaction temperature between about 0° C. and 35° C. The chlorine atoms are replaced with fluorine at a reaction temperature between about 50° C. and 90° C. The formation of the organo(trifluoromethyl)-mercury and the organo mercuric fluoride are more fully described in a copending application filed concurrently herewith in the names of Dietmar Seyferth, Steven P. Hopper and Kirk V. Darragh entitled "Method for Making Organo-(Fluoromethyl)Mercury Compounds."

Any solvent inert to the reactants can be employed. All that is necessary is that the solvent provide suitable dispersing action for the reactants to assure relatively complete reaction. Particularly suitable solvents are mononuclear aromatics, hydrocarbons such as benzene, toluene, xylene or the like; alkanes such as hexanes, heptanes, octanes, decanes, dodecanes, pentadecanes, octadecanes, eicosanes, and the like; cyclohexanes, petroleum ether, kerosene or the like. It is to be understood that the present invention also can be conducted when using glyme or diglyme as a solvent even though they are not required. The glyme or diglyme are employed when the difluorocarbene acceptor is not soluble in any of the common solvents.

The following example illustrates the present invention and is not intended to limit the same.

EXAMPLE I

A mixture of 5.5 mmoles of phenyl(trifluoromethyl)mercury, 12.5 mmoles of well-dried sodium iodide, 16.5 mmoles of cyclohexane and 15 ml. of dry benzene was stirred and heated at reflux under nitrogen for 19 hours. The reaction mixture then was filtered to remove 3.6 g. of white solid (from which phenylmercuric iodide was recovered by Soxhlet extraction). The filtrate was vacuum-distilled and the product recovered. Gas-liquid partition chromatography showed that 7,7-difluoronocarbane was present in 83% yield.

Employing the same reaction conditions but by substituting 1-heptene ar allyltrimethylsilane, the products obtained were 1,1-difluoro - 2 - n - amylcyclopropane (70% yield) and 1,1-difluoro - 2 - trimethylsilylmethylcyclopropane (99% yield).

We claim:
1. A process for forming difluorocarbene in situ which comprises reacting an organo(trifluoromethyl)mercury compound of the formula:

$$RHgCF_3$$

wherein R is alkyl, aryl, haloaryl or alkaryl and sodium iodide dispersed in a solvent inert with respect to said organo(trifluoromethyl)mercury compound and sodium iodide and in which the sodium iodide is substantially insoluble at a temperature between 30° and 200° C., said solvent selected from the group consisting of a mononuclear aromatic hydrocarbon compound, an alkane, cyclohexane, petroleum ether and kerosene.

2. The process of claim 1 wherein the solvent is a mononuclear aromatic hydrocarbon.

3. The process of claim 1 wherein the organo(trifluoromethyl)mercuric compound is phenyl(trifluoromethyl)-mercury.

4. The process of claim 2 wherein the organo(trifluoromethyl)mercuric compound is phenyl(trifluoromethyl)-mercury.

5. The process of claim 1 wherein the solvent is benzene.

6. The process of claim 3 wherein the solvent is benzene.

References Cited

UNITED STATES PATENTS 3,349,136   10/1967   Boudakian et al. ____ 260—648 F

OTHER REFERENCES

Seyferth et al., J. Am. Chem. Soc. (1967), 89, 959–966.
Seyferth et al., J. Am. Chem. Soc. (1969), 91, 6536–6537.

DANIEL D. HORWITZ, Primary Examiner

U.S. Cl. X.R.
260—648 C, 448.2